March 11, 1969    J. H. TAYLOR ET AL    3,432,535
TWO-STEP PROCESS FOR THE OXIDATION OF ALUMINUM ALKYLS
Filed Feb. 19, 1964
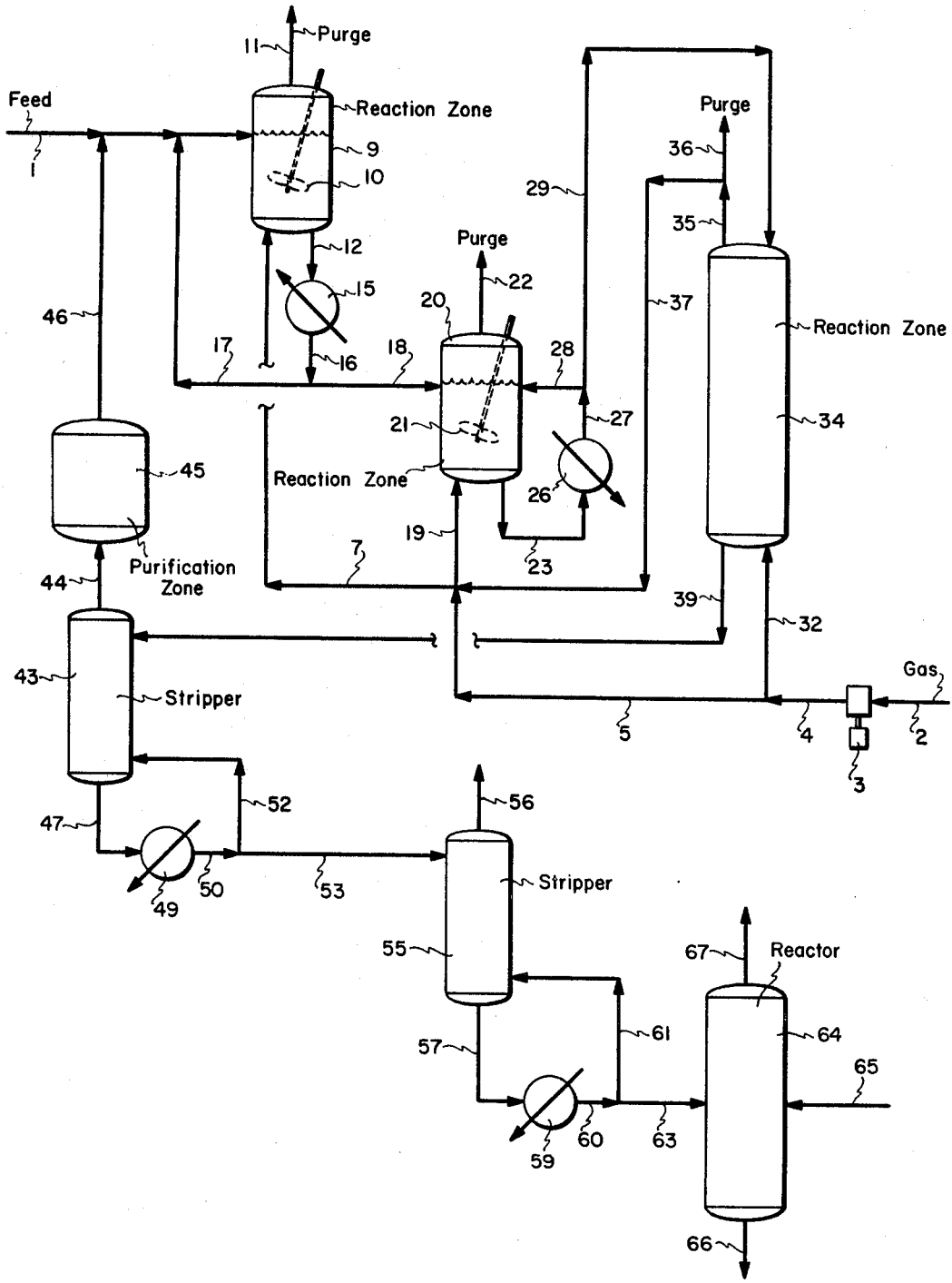
JAMES HOWARD TAYLOR
CLARENCE MARTIN EIDT, JR.    INVENTORS
BY  *Frank A. Simock*
PATENT ATTORNEY 3,432,535
TWO-STEP PROCESS FOR THE OXIDATION OF ALUMINUM ALKYLS
James Howard Taylor and Clarence Martin Eidt, Jr., Baton Rouge, La., assignors to Esso Research and Engineering Company, a corporation of Delaware
Filed Feb. 19, 1964, Ser. No. 345,994
U.S. Cl. 260—448
Int. Cl. C07f 5/06
12 Claims

ABSTRACT OF THE DISCLOSURE

In the oxidation of aluminum alkyls to aluminum alkoxides, the formation of undesirable by-products is suppressed by conducting the oxidation at a first temperature in the range of from 15 to 30° F. for a time sufficient to achieve at least an 80% conversion of the aluminum alkyl to the alkoxide form and thereafter continuing the oxidation at a temperature in the range of from about 90 to 130° F. for a time sufficient to completely oxidize the reaction product.

---

This invention relates to a process for preparing aluminum alcoholates and alcohols from aluminum trialkyls. More particularly this invention is concerned with the oxidation of aluminum trialkyls to form the corresponding alkoxides which are then hydrolyzed to form the corresponding alcohols. Most particularly the invention is concerned with carrying out the oxidation of aluminum trialkyls in such a manner as to supress the formation of by-products and contaminants thereby producing excellent yields of primary alcohols.

It is known in the prior art that high molecular weight aluminum hydrocarbons can be prepared by either growing an alpha olefin, such as ethylene, on an aluminum hydrocarbon, e.g. triethylaluminum, or by displacing one or all of the hydrocarbon groups in an aluminum hydrocarbon compound with a mixture of higher alpha olefins. The aluminum trialkyls produced in the above-described manner are known to be useful starting materials in the preparation of alcohols by an essentially two-step process wherein the trialkyls are oxidized and then hydrolyzed. While a variety of reaction conditions may be employed where alcohol purity and yields are not critical such processes have undersirable limitations where the alcohols are intended for subsequent use in detergent or plasticizer manufacture. The above-mentioned undesirable limitations are known to be the result of side reactions occurring during the oxidation of aluminum trialkyls which produce undesirable products such as carbonyl compounds, thereby reducing alcohol yield. In addition, these uncontrolled reaction conditions result in a final alcohol product contaminated with hydrocarbons.

It is an object of this invention to provide an improved process for preparing high yields of primary alcohols.

It is another object of this invention to prepare straight chain primary monohydric alcohols that are essentially free of contaminants and which are useful in the manufacture of detergents and polymer plasticizers.

In accordance with the present invention, an aluminum trialkyl or mixtures of aluminum trialkyls, wherein each alkyl radical contains from 2 to 24+ carbon atoms, are oxidized in two stages under critical temperature conditions for carefully controlled periods of time. While prior art investigators (see for example, U.S. Patent 3,097,226) have suggested that low temperatures should be employed throughout the oxidation reaction or a combination of higher temperature followed by low temperature should be utilized in a two-stage operation, it has now been discovered that a low temperature oxidation stage followed by a higher temperature oxidation stage is essential in achieving the desired high yield and purity alcohol. While not wishing to be limited by any particular theory, it is now believed that the complete oxidation of a higher molecular weight aluminum trialkyl to the alkoxide requires temperatures substantially above room temperature but that the formation of carbonyl compounds or other undesirable by-products which reduce yields is increased by these higher temperatures. Thus, it would appear that the desire for high yields of alkoxides and subsequently of alcohols would necessarily be incompatable. However, it is further believed that the formation of carbonyls is minimized, if not eliminated, by low temperature oxidation. Therefore, the present invention contemplates the utilization of low temperature oxidation for a time sufficient to convert the bulk of the trialkyl to the alkoxide without substantial formation of by-products followed by a relatively rapid higher temperature oxidation under carefully controlled conditions for the purpose of completely oxidizing all unconverted or partially converted higher molecular weight aluminum trialkyls and increasing the total yield of alkoxide. It is further believed that the higher temperature oxidation stage is essential for obtaining a high purity alcohol since partially oxidized higher molecular weight alkoxides cannot be separated by conventional means and result in hydrocarbon contamination of the final product upon hydrolysis. While it would appear that the use of the higher temperature oxidation would produce the undesired by-products which reduce the over-all yield, it should be noted that such temperatures are not employed until substantially complete conversion of the highly reactive alkyl starting material has been accomplished and it appears that the alkoxides are more resistant to side reactions. Thus, the process of the present invention results in a yield and purity of alcohol which has heretofore been unobtainable.

The aluminum trialkyls which may be oxidized in accordance with the present invention may be represented by the following formula:

wherein $R_1$, $R_2$ and $R_3$ may be the same or different and are alkyl radicals containing from 2–24 or more carbon atoms each. Thus typical aluminum trialkyls include aluminum trihexyl, trioctyl, tridecyl, tridodecyl, etc. The mixed aluminum trialkyls are illustrated by the following: aluminum hexyldioctyl, aluminum dihexyl-octyl, aluminum butyl-octyl-dodecyl; aluminum diheptylnonyl and so forth.

The particular manner in which these aluminum trialkyls are prepared is not a critical factor of this invention; however, to illustrate the utility and versatility of the instant invention a few general methods of preparation will be briefly outlined. Low molecular weight aluminum trialkyls, the starting materials for higher aluminum trialkyls may be prepared by reacting a low molecular weight alkyl halide with aluminum metal, preferably in the form of an alloy with magnesium, at elevated temperatures, or by reacting, for example, Al+$H_2$+olefin at pressures of 1500–3000 p.s.i.a. and moderate temperatures.

One way of preparing a higher molecular weight aluminum trialkyl, e.g. trioctyl, is to react a higher olefin, e.g. n-octene-1 with a low molecular weight aluminum trialkyl to produce aluminum trioctyl as shown in the following equation:

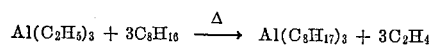

Higher aluminum trialkyls can also be obtained by the growth reaction whereby a low molecular weight aluminum trialkyl is reacted with ethylene (usually in the presence of an inert diluent to obtain increased reaction rates under elevated temperatures) to grow the lower olefin onto the alkyl radicals of the aluminum trialkyl. Suitable conditions are temperatures of 25–100° C., ethylene partial pressures of 500–3000 p.s.i.a., reaction times 1–10 hours and diluent concentrations (if a diluent is used) of 1–90, preferably 5–30 wt. percent based on growth product mixture. Suitable diluents are the same ones used in the oxidation to alcoholates step which will be described below. The following equation is illustrative of this so-called growth reaction:

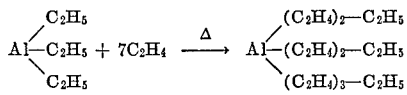

The length and distribution of the alkyl radicals on the aluminum trialkyl growth product can be varied with the operating conditions and length of reaction time. Generally, the growth is controlled to obtain product aluminum trialkyls having a smear of various molecular weight compounds wherein the alkyl radicals will contain from 2–24+ carbon atoms. Thus, for example, it may be desired to obtain a growth product averaging between about 8–12 carbon atoms per alkyl group.

The aluminum trialkyl feed described above is preferably fed to the oxidation stage of the reaction dissolved in an inert solvent. Typical of the solvents which may be employed in the reaction are paraffinic hydrocarbons, such as octane or decane, aromatic hydrocarbons, such as toluene or xylene and halogenated hydrocarbons, such as carbon tetrachloride and chlorobenzene. It has now been discovered that the amount of dilution of the trialkyl feed has an important effect on the yield derivable from a low temperature oxidation reaction. The alkyl concentration should be maintained between 25 and 80 wt. percent of the trialkyl feed and preferably 40 to 60 wt. percent.

The oxygen containing gas employed in the oxidation reaction can be oxygen, air or any other gas containing molecular oxygen. The gas employed in the oxidation is predried to eliminate water which may promote undesired side reactions. Optimum concentrations of oxygen in the gas are in the range of 5 to 21% by volume and preferably 10 to 21 volume percent. Thus, predried air may be diluted with an inert gas, such as nitrogen, to obtain the desired oxygen concentration. The rate of oxygen addition to the reaction is a further important feature of this invention and must be carefully controlled to obtain optimum yields and purity of the final product, especially in batch operations. The rate should be controlled between 0.1 to 2.0 standard cubic feet of oxygen per hour per pound of aluminum trialkyl and preferably 0.4 to 1.0 standard cubic feet per hour in batch operations. In a continuous oxidation reaction, the fresh alkyl feed is prediluted with partially oxidized alkyls in order to moderate the reaction rate, and under these conditions the rate of oxygen addition may be widely varied without harmful effect on the reaction.

As discussed earlier in this specification, the oxidation conditions are a critical feature of this invention. The first stage of oxidation must be carried out at temperatures which are low enough to avoid the production of significant quantities of by-products via side reactions, yet high enough to effect efficient heat and mass transfer since the alkoxides formed may be in a solid or semi-solid form at low temperatures. Suitable temperatures are in the range of 15° to 40° F., preferably 15° to 30° F., e.g., 25° F., and these limits must be rigorously observed. Due to the viscous nature of the alkoxides formed in the low temperature oxidation, as well as the exothermic nature of the reaction, the reaction mixture must be well mixed so that fresh alkyl will be diluted with partially oxidized product, thereby moderating the reaction rate so as to maintain effective temperature control and avoid localized overheating. The reaction pressure may vary widely but is generally maintained in the range of 15 to 50 p.s.i.a. The reaction time is also a critical feature of the first oxidation stage. It is essential that the bulk of conversion of the alkyl to the alkoxide take place in the first oxidation stage where by-product formation is minimized. Thus, the first stage of oxidation should be continued for a time sufficient to produce an 80 to 98% conversion of the alkyl feed and preferably 90 to 95%. In general with the critical temperature limits specified above, the reaction time will be in the range of 2 to 6 hours and preferably 3 to 5 hours.

The second oxidation stage is also carried out under critical time and temperature conditions. The substantially oxidized alkyl from the first oxidation stage is reacted at temperatures in the range of 70° to 200° F., preferably 90° to 130° F. for a time sufficient to completely oxidize the reaction product obtained from the first stage of the reaction. Suitable reaction times are 1 to 30 minutes, and preferably 5 to 15 minutes. It is essential to obtain a rapid and complete conversion since product degradation and contamination must be avoided. Thus, in an optimum sequence the second oxidation stage is plug flow in the liquid phase and countercurrent with the oxygen containing gas, thereby assuring a high degree of conversion while avoiding back-mixing.

Following the oxidation stages, the oxygenated product comprising the trialkoxide, xylene diluent and by-products formed during oxidation are fed to a stripper where separation is accomplished by conventional means. In a preferred stripping operation, the xylene as well as lighter by-products are separated from the oxygenated products at a temperature of 400° to 550° F., preferably 450° to 480° F., and a pressure of 1 to 25 p.s.i.a. and preferably 10 to 15 p.s.i.a. The xylene recovered overhead may be recycled to the first oxidation stage. The bottoms product from the first stripper consisting of the oxygenated products is then stripped further to remove heavier by-products and contaminants from the trialkoxide. Stripping conditions are governed by those conditions which promote substantial decomposition of any partially oxidized material without degradation of completely oxidized trialkoxide. Typical stripping conditions are temperatures in the range of 400° to 550° F., preferably 450° to 500° F., and pressures in the range of 0.5 to 20 mm. Hg absolute, preferably 1 to 10 mm. Hg absolute. An inert stripping gas such as dry nitrogen may be employed in the vacuum stripping operation to aid in the removal of impurities.

It has been discovered that the xylene recovered from the stripper is contaminated with oxidation reaction by-products such as olefins, carbonyls, alcohols, esters and paraffins. Thus if the xylene is to be recycled for use as an oxidation diluent it must be subjected to purification prior to re-admitting the diluent to the oxidation reactor. Treatment of the xylene stream by silica gel percolation has been found to effectively remove alcohol and carbonyl impurities. Such treatment results in eventual alcohol yields which are equivalent to those derived from oxidations utilizing virgin diluent.

The aluminum trialkoxide recovered from the stripping operation is hydrolyzed with water under acidic or basic conditions at temperatures of 50° to 150° F., atmospheric pressure or above, and reaction times of 10 minutes to 10 hours. Upon completion of the hydrolysis reaction, the freed alcohols separate into a distinct liquid layer which may be recovered from the aqueous layer by conventional techniques, such as decantation.

The accompanying drawing represents an over-all processing scheme for the oxidation, stripping and hydrolysis of aluminum trialyls to produce primary alcohols. In the preferred embodiment, reactors 9 and 20 are in series and represent the first or low temperature stage of the oxidation reaction while reactor 34 represents the second or higher temperature oxidation stage. In an alternative embodiment (not shown), the first stage of oxidation may take place in a single vessel rather than in two vessels.

Referring to this drawing, aluminum trialkyl in combination with an inert diluent, such as xylene, is introduced through line 1 to the first stage oxidation reactor 9 which is equipped with agitation means 10. The feed introduced through line 1 is premixed with partially oxidized alkyl recovered by recycling a portion of the reaction product through line 17. The recycling and premixing procedures are vital if hot spots at the feed point to reactor 9 are to be avoided. Preferably at least 90 wt. percent of said partially oxidized alkyl is recycled and employed for further dilution of the fresh trialkyl feed. Predried air or other oxygen containing gas enters through line 2, is pressurized in compressor 3 and passes through lines 4, 5 and 7 to reactor 9. Spent gas from the oxidation reaction taking place in reactor 9 is removed through line 11. Reacted material is removed from the reactor through line 12 and is cooled in cooler 15. The cooled reaction mixture passes through line 16 and thereafter a portion of this material is recycled to feed line 1 through line 17 as described above. The remainder of the reaction mixture passes through line 18 to the second reaction vessel 20 of the first stage of oxidation. Reactor 20 is equipped with agitation means 21. Fresh oxygen containing gas is fed to reactor 20 through lines 5 and 19 and spent gas is removed through line 22. The oxygenated reaction mixture is removed through line 23 and passes through cooler 26. The cooled reaction mixture passes through line 27 and a portion of this mixture is recycled through line 28 to reaction vessel 20.

The remainder of the reaction mixture passes through line 29 to the second stage oxidation reactor 34. The reaction vessel is equipped with either plates or packing, such as Rashig rings to create plug flow. Fresh oxygen containing gas is admitted to the bottom of reactor 34 after passing through line 2, compressor 3 and lines 4 and 32 and is countercurrently contacted with the reaction mixture from the first oxidation stage. Spent gas from reactor 34 is passed through line 35 and may either be vented through line 36 or recycled through line 37 and 7 for use as a diluent in the gas fed to the first stage of oxidation.

The completely oxidized reaction mixture is removed through line 39 and passes to stripper 43. The inert solvent, e.g. xylene, is removed overhead through line 44 and after suitable purification in zone 45 may be recycled through line 46 for use with fresh alkyl fed through line 1 to reactor 9. The reaction mixture comprising a substantial amount of alkoxides as well as other oxygenated materials is removed from stripper 43 through line 47 and passes through reboiler 49 and thence through line 50. A portion of the reaction mixture is recycled to stripper 43 via line 52 and the remainder passes through line 53 to a second stripper 55 where heavy ends are taken off overhead via line 56. The bottoms consisting predominantly of aluminum trialkoxide are removed via line 57 and pass through reboiler 59 and then through line 60. A portion of the bottoms is recycled through line 61 to stripper 55.

The remainder of the alkoxide stream passes through line 63 to hydrolyzer 64. The hydrolyzing material enters the hydrolyzer via line 65. The aqueous layer is drawn off through line 66 and the alcohol product is recovered from line 67.

The invention will be further understood by reference to the following illustrative examples.

Example 1

In each of the following examples, 1–6, the oxidation feed was a growth aluminum trialkyl consisting of a smear containing from 2 to 24+ carbon atoms per alkyl group prepared as described earlier in this specification. The growth product in all instances was diluted with an equal weight of dry xylene and charged to a reactor. The reactor employed was a glass resin flask equipped with a motor driven agitator and a cooling coil and heating lamp for temperature control. Air was metered through a rotameter to a sparger tube located under the reactant surface. An oxygen analyzer provided a continuous record of off gas oxygen concentration by which the rate of reaction could be determined.

In each run samples of oxidation products were stripped to a final pot temperature of 482° F. at 5 mm. Hg absolute pressure to remove oxidation diluent and by-products. Stripped alkoxide was diluted with an equal weight of benzene, hydrolyzed with dilute acid, separated from the aqueous phase and weighed. The final product was analyzed by gas chromatography to determine over-all alcohol yield.

In accordance with the procedure outlined above, five separate batch oxidation runs were made and composited for analysis. In each run oxidation was carried out at 25° F. until the oxygen analyzer indicated no further oxygen consumption—a period of approximately 260 minutes. Thereafter the temperature was raised to 125° F. for a period of 30 minutes in order to complete the reaction. The total $C_6$ to $C_{20}$ alcohol yield was 92.1% of the theoretical value. Detailed operating conditions for the experiment are shown in Table I below.

Example 2

The procedure of Example 1 was followed with the exception that the entire oxidation reaction was carried out at low temperature (22° F.) for a period of 260 minutes at which time no further oxygen consumption was observed. The total yield of $C_6$ to $C_{20}$ alcohol was 88.6% of the theoretical value. Detailed operating conditions and results for this example are tabulated in Table I below.

Example 3

An oxidation reaction was carried out employing the procedure of Example 1 with the exception that the temperature of reaction was maintained at 90° F. The total yield of $C_6$ to $C_{20}$ alcohol was 75.6% of the theoretical value. The operating conditions and results are shown in Table I.

Example 4

An oxidation reaction was carried out employing the procedure of Example 1 with the exception that two stages of temperature were utilized. The first stage was maintained at 90° F. for a period of 190 minutes. Thereafter, the temperature was reduced to 22° F. and the reaction was continued for an additional 100 minutes. The total yield of $C_6$ to $C_{20}$ alcohol was 77.7% of the theoretical value. The operating conditions and results are shown in Table I below.

Example 5

The oxidation reaction was carried out utilizing the procedure described in Example 1 with the exception that the low temperature (25° F.) of the reaction was maintained for a period of only 45 minutes prior to the second stage of reaction at 90° F. A substantial quantity of alkyl remained to be reacted at low temperature as evidenced by the fact that oxygen was still being consumed at low temperature. The yield of $C_6$ to $C_{20}$ alcohol was 73.9% of the theoretical value. The operating conditions and results are shown in Table I.

Example 6

The oxidation reaction was carried out as described in Example 1 with the exception that no diluent was employed during hydrolysis of the alkoxide. The yield of $C_6$ to $C_{20}$ alcohol was 91.8% of the theoretical value. The operating conditions and results are shown in Table I below.

Analysis of the organic phase recovered after hydrolysis gave the following results:

| | Wt. percent |
|---|---|
| Total alcohols | 83.4 |
| Paraffins | 0.9 |
| Olefins | 0.6 |
| Heavy ends | 15.1 |

The heavy ends are easily separated by conventional techniques. Thus, the experiment indicates that both high yields and excellent purity of alcohol products are produced by the procedure of this invention.

TABLE I

| Example | 1 | 2 | 3 | 4 | 5 | 6 |
|---|---|---|---|---|---|---|
| Air rate, s.c.f.h. $O_2$/lb. alkyl | 0.63 | 0.89 | 0.89 | 0.89 | 0.89 | 0.5 |
| First stage: | | | | | | |
| Residence time, min | 260 | 260 | 200 | 190 | 45 | 304 |
| Temp., °F | 25 | 22 | 90 | 90 | 25 | 25 |
| Second stage: | | | | | | |
| Residence time | 30 | None | None | 100 | 175 | 91 |
| Temp., °F | 125 | None | None | 22 | 90 | 120 |
| Aluminum alkyl charge, grams | ¹1,946 | 379 | 333 | 379 | 300 | 387 |
| Xylene charge, grams | ¹1,946 | 379 | 333 | 379 | 300 | 387 |
| Oxidation product, grams | ¹3,946 | 777 | 678 | 777 | 609 | 790 |
| Charge to stripping, grams | 3,341 | 488.3 | 100 | 100 | 430.8 | 786.4 |
| Stripped alkoxide, grams | 1,613 | 237.9 | 45.4 | 46.5 | 195.5 | 371.7 |
| Alkoxide to hydrolysis, grams | 50 | 235.5 | 45.4 | 45.75 | 194 | 360.8 |
| Benzene to hydrolysis, grams | 50 | 235.5 | 45.4 | 45.75 | 194 | |
| Organic phase from hydrolysis, grams | 95 | 456.1 | 82.5 | 46.7 | 371.5 | 347.8 |
| Alcohol recovery, percent of theoretical: | | | | | | |
| $C_6$ | 77.9 | 80.9 | 14.2 | 23.5 | 22.6 | 77.6 |
| $C_8$ | 96.0 | 96.6 | 56.4 | 74.7 | 60.2 | 91.1 |
| $C_{10}$ | 95.6 | 95.3 | 82.1 | 83.3 | 77.8 | 95.5 |
| $C_{12}$ | 97.1 | 90.4 | 86.2 | 85.3 | 81.0 | 94.8 |
| $C_{14}$ | 98.0 | 97.2 | 87.4 | 77.3 | 82.9 | 96.6 |
| $C_{16}$ | 91.9 | 84.8 | 84.9 | 87.0 | 81.2 | 93.4 |
| $C_{18}$ | 82.2 | 73.3 | 82.6 | 87.2 | 78.2 | 96.3 |
| $C_{20}$ | 60.6 | 54.7 | 75.5 | 80.0 | 72.7 | 68.2 |
| Total $C_6$–$C_{20}$ | 92.1 | 88.6 | 75.6 | 77.7 | 73.9 | 91.8 |

¹ Total for 5 batch oxidations.

A comparison of the results of Examples 1–6 shown in Table I indicates the criticality of following the procedure of this invention. It should be noted that low temperature oxidation, high temperature oxidation or high temperature oxidation followed by low temperature oxidation, as shown in Examples 2, 3 and 4 respectively, all result in yields of product which are distinctly lower than those obtained in Examples 1 and 6 where low temperature oxidation followed by high temperature oxidation was employed. Furthermore, a comparison of Example 5 with Examples 1 and 6 indicates the criticality of carrying the low temperature portion of reaction to substantial completion.

Example 7

This example illustrates the application of the invention to a continuous oxidation process and the excellent results obtainable by such application.

A feed blend was prepared by mixing equal weights of growth aluminum alkyl with dry xylene. This mixture was continuously fed to an agitated metal reactor at a rate of 6.3 lbs./hr. The reactor was equipped with a pump around and a liquid level control system. Feed was introduced to the reactor through the pump around stream to assure dilution of the feed with partially reacted alkyl before contacting it with air. The holdup in the reactor was 30.2 lbs. of liquid thereby giving a holdup time of 4.8 hours.

Air was introduced through a sparger tube at a rate of 42.6 s.c.f.h. Reactor pressure was maintained at 50 p.s.i.a. and temperature was 250° F.±4° F. Oxygen concentration in the off gas was 14.7 vol. percent.

Partly oxidized product was accumulated in a storage vessel. After accumulating a sufficient quantity of partly oxidized product in the vessel the alkyl feed was discontinued. The partly oxidized product was then fed from the storage vessel to the reactor in order to simulate a second reactor in series. Conditions for this second pass were: 25° F., 50 p.s.i.a., 6.0 lbs./hr. feed rate, and 3.8 hours residence time. Oxygen concentration in the off gas was 20 vol. percent.

The product obtained from the second pass was pumped to the top of a vertical packed tower (3″ pipe containing 50″ of packing) reactor and countercurrently contacted with upflowing air. The feed rate was 6 lbs./hr. with an estimated residence time of 11 minutes. Reactor pressure was 50 p.s.i.a. Reactor temperature varied from 110° F. at the top to 125° F. at the bottom. Concentration of oxygen in the off gas as 20.5 vol. percent.

A sample of the oxidized product from the packed tower reactor was vacuum stripped, hydrolyzed and analyzed by gas chromatography employing the procedures of Example 1. Analysis indicated that the total alcohol yield was 90.4% of the theoretical value. The results are tabulated in Table II below.

Table II

| Carbon number: | Alcohol yield Percent of theoretical |
|---|---|
| 4 | 50.9 |
| 6 | 79.4 |
| 8 | 86.6 |
| 10 | 90.3 |
| 12 | 92.9 |
| 14 | 95.6 |
| 16 | 95.2 |
| 18 | 96.3 |
| 20 | 80.0 |
| Total $C_4$–$C_{20}$ | 90.4 |

Example 8

This example illustrates the effect of the purity of the recycled xylene diluent on the yields obtainable from the first stage of the oxidation process.

The data in Table III below indicate the effect on alcohol yields of using recycled xylene as a diluent to the oxidation reaction. Run 1 indicates the yield obtained with fresh xylene while Runs 2 and 3 show the effect on yield of re-utilizing the xylene. The improvement in alcohol yield resulting from silica gel percolation of the xylene prior to use in the oxidation reaction is illustrated by Run 4. The increase in impurities upon reuse of the xylene and the effect of silica gel percolation in cleaning up these impurities is indicated by the xylene inspection data.

TABLE III

| Run No | 1 | 2 | 3 | 4 | |
|---|---|---|---|---|---|
| Oxidation temp., °F | 25 | 25 | 25 | 25 | |
| Air rate, s.c.f.h. O₂/lb. alkyl | 0.6 | 0.72 | 0.72 | 0.72 | |
| Alkyl conc., wt. percent in xylene | 50 | 50 | 50 | 50 | |
| Xylene source | Fresh | (¹) | (²) | (³) | |
| C₆–C₂₀ alcohol yield, percent of theory | 92.1 | 84.9 | 81.6 | 86.4 | |
| | | | | After treat., before oxd. | After oxd. |
| Xylene inspection: | | | | | |
| Hydroxyl No | 2.78 | 11.56 | 13.44 | 0.41 | 10.73 |
| Bromine No | 4.20 | 6.7 | 8.9 | 2.0 | 0.89 |
| Carbonyl No | 0.07 | 0.31 | 0.33 | 0.04 | 0.39 |
| Sap No | 0.8 | 1.47 | 1.67 | 1.88 | |

¹ Recovered from Run 1.
² Recovered from Run 2.
³ Recovered from Run 3 and treated with silica gel.

Having thus described the general nature and specific embodiments of the invention, the true scope will be pointed out by the appended claims.

What is claimed is:

1. An oxidation process which comprises reacting aluminum alkyl growth product with a molecular oxygen containing gas at a first temperature in the range of 15° to 30° F. for a time sufficient to effect at least an 80% conversion of said alkyl to alkoxides, thereafter increasing the reaction temperature to the range of 90° to 130° F. and reacting the substantially converted alkyl growth product with a molecular oxygen containing gas for a time sufficient to completely oxidize the reaction product obtained at said first temperature.

2. The process of claim 1 wherein the molecular oxygen containing gas is fed to the reaction at a rate of 0.4 to 1.0 standard cubic feet of oxygen per hour per pound of said aluminum trialkyl growth product.

3. The process of claim 1 wherein said aluminum alkyl growth product contains from 2 to 24 carbon atoms per alkyl group.

4. The process of claim 2 wherein said aluminum alkyl growth product is diluted with 25 to 80 wt. percent of an inert organic solvent.

5. The process of claim 1 wherein said first temperature is maintained until oxidation at said first temperature ceases.

6. The process of claim 1 wherein said first temperature is maintained for a time sufficient to effect 90–95% conversion of said alkyl to alkoxides.

7. The continuous oxidation process for oxidizing an aluminum trialkyl to the corresponding aluminum alkoxide, each alkyl group of said aluminum trialkyl containing from 2–24 carbon atoms, which comprises continuously passing said aluminum trialkyl in a first agitated reaction zone, continuously admitting a molecular oxygen containing gas to said first reaction zone, maintaining a temperature in the range of 15° to 30° F. in said first reaction zone, holding said aluminum trialkyl growth product in said first reaction zone for a time sufficient to effect at least an 80% conversion of said trialkyl to alkoxides, removing a substantially oxidized alkyl from said first reaction zone, recycling a portion of said substantially oxidized alkyls and admixing said portion with said aluminum trialkyl growth product prior to passing said aluminum trialkyl growth product to said first reaction zone, passing the remainder of said oxidized alkyls from said first reaction zone to a second reaction zone, maintaining said second reaction zone at a temperature in the range of 90° to 130° F., countercurrently contacting said oxidized alkyls with molecular oxygen containing gas under plug flow conditions for a period of 1–30 minutes and recovering a completely oxidized trialkyl product.

8. The process of claim 7 wherein said aluminum alkyl growth product is diluted with 25–80 wt. percent of an inert organic solvent.

9. The process of claim 8 wherein the inert organic solvent is xylene.

10. The process of claim 7 wherein at least 90 wt. percent of said substantially oxidized alkyl recovered from said first reaction zone is recycled and admixed with said aluminum trialkyl growth product.

11. The process of claim 7 wherein said aluminum trialkyl growth product is held in said first reaction zone for a time sufficient to effect a conversion to alkoxides in the range of 90–95%.

12. An oxidation process which comprises reacting an aluminum trialkyl growth product having 2–24 carbon atoms per alkyl group with a molecular oxygen containing gas, 0.4 to 1 standard cubic feet of oxygen per hour of said gas being employed per pound of said trialkyl, at a first temperature in the range of 15° to 30° F. for a period of 3–5 hours, wherein 90 to 95% of said aluminum trialkyl growth product is converted to alkoxides; thereafter increasing the reaction temperature to the range of 90° to 130° F. and reacting a substantially converted alkyl growth product with a molecular oxygen containing gas for a period of 1 to 30 minutes.

References Cited
UNITED STATES PATENTS 2,696,304  12/1954  Gilmore.
3,153,076  10/1964  Wood et al. _____ 260—448

TOBIAS E. LEVOW, *Primary Examiner.*

H. M. S. SNEED, *Assistant Examiner.*